(12) United States Patent
Menin

(10) Patent No.: US 6,703,583 B2
(45) Date of Patent: Mar. 9, 2004

(54) METHOD AND SYSTEM FOR LASER WELDING OF TWO OR MORE OVERLAPPED METAL SHEETS, AND DEVICE FOR CLAMPING THE SHEETS USED IN THIS METHOD

(75) Inventor: Roberto Menin, Grugliasco (IT)

(73) Assignee: Comau SPA, Grugliasco (IT)

( * ) Notice: Subject to any disclaimer, the term of this patent is extended or adjusted under 35 U.S.C. 154(b) by 39 days.

(21) Appl. No.: 10/084,993

(22) Filed: Mar. 1, 2002

(65) Prior Publication Data

US 2002/0121506 A1 Sep. 5, 2002

(30) Foreign Application Priority Data

Mar. 2, 2001 (IT) .................................... TO2001A0185

(51) Int. Cl.[7] .............................................. B23K 26/00
(52) U.S. Cl. ........................ 219/121.64; 219/121.63; 219/121.85
(58) Field of Search ................ 219/121.64, 121.63, 219/121.85, 78.15, 121.14

(56) References Cited

U.S. PATENT DOCUMENTS

| | | | |
|---|---|---|---|
| 4,030,525 A | * | 6/1977 | Bassler et al. .............. 428/586 |
| 4,745,257 A | | 5/1988 | Rito et al. |
| 5,383,592 A | * | 1/1995 | Fussnegger et al. ........ 228/135 |
| 5,573,222 A | * | 11/1996 | Ruehl et al. ................ 248/647 |
| 5,603,853 A | * | 2/1997 | Mombo-Caristan .... 219/121.64 |
| 6,060,681 A | * | 5/2000 | Bachhofer et al. ...... 219/121.63 |

FOREIGN PATENT DOCUMENTS

| | | |
|---|---|---|
| DE | 42 19 549 A1 | 12/1993 |
| EP | 0 858 857 A1 | 8/1998 |
| JP | 10 156 566 A | 6/1998 |
| WO | WO 01/12378 A | 2/2001 |

\* cited by examiner

Primary Examiner—M. Alexandra Elve
(74) Attorney, Agent, or Firm—Sughrue Mion, PLLC

(57) ABSTRACT

Welding of two or more steel sheets, at least one of which has a protective layer of a material with a low vaporization temperature, is carried out by directing a laser beam on two overlapped flanges of the sheets, which are clamped in position during welding by means of clamping devices. These clamping devices are able to hold the flanges to be welded in a slightly spaced apart position from each other, so as to create a gap, which does not jeopardize the possibility of carrying out the welding while enabling evacuation of the vapors of the protective material, which are generated during welding.

18 Claims, 6 Drawing Sheets

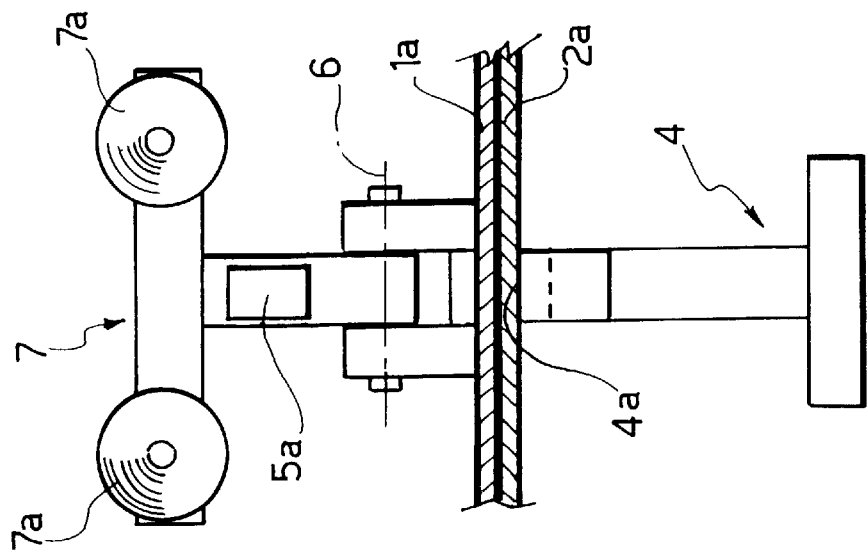
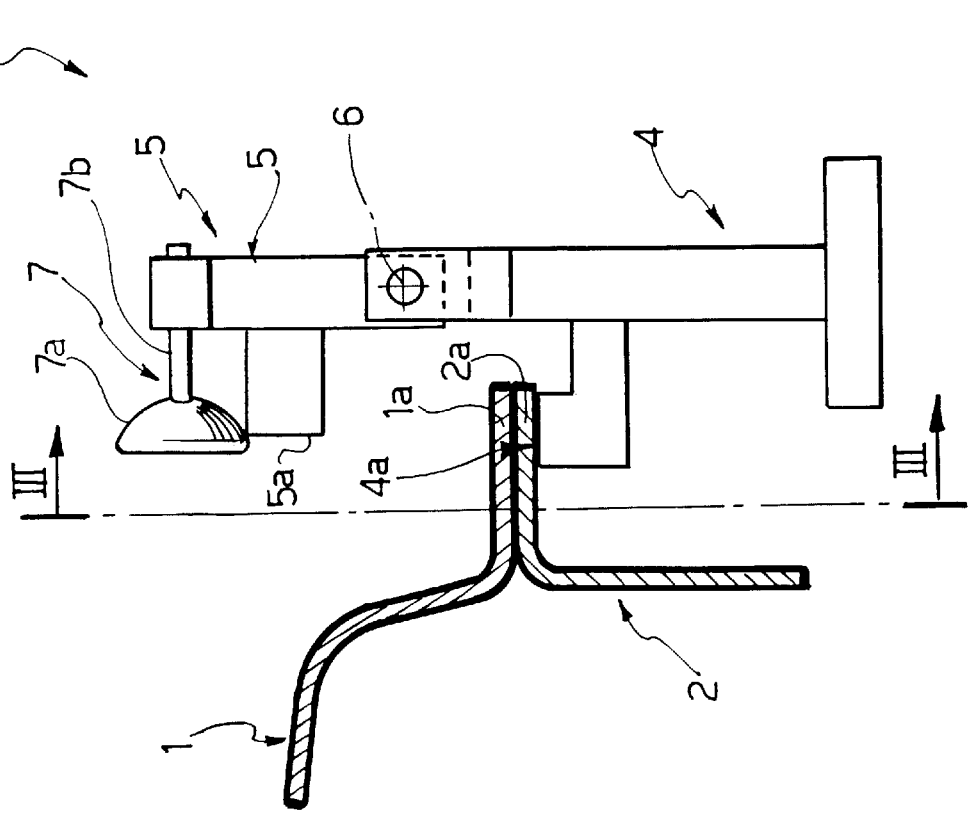

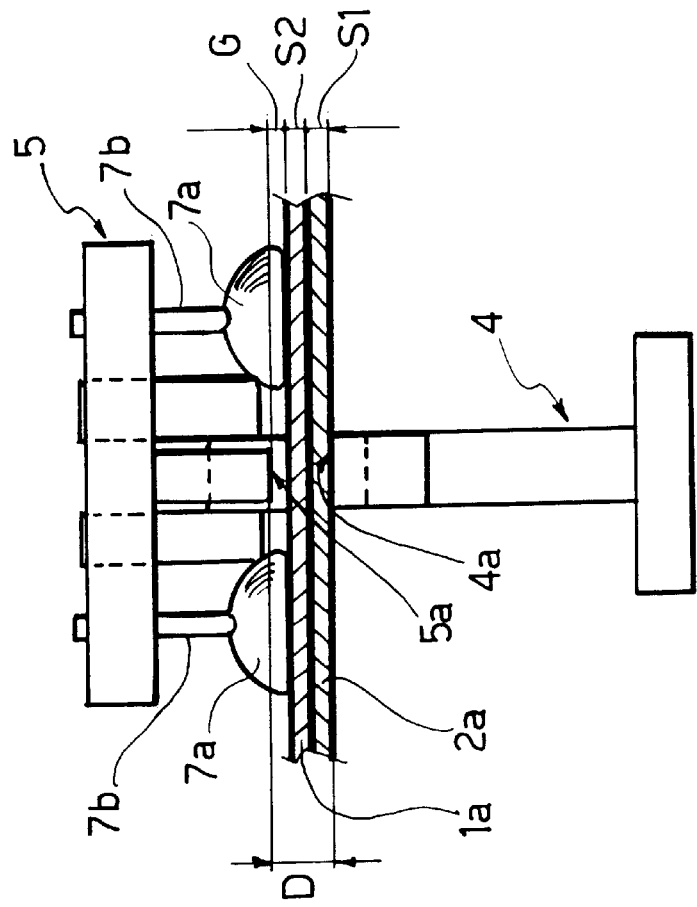

METHOD AND SYSTEM FOR LASER WELDING OF TWO OR MORE OVERLAPPED METAL SHEETS, AND DEVICE FOR CLAMPING THE SHEETS USED IN THIS METHOD

The present invention relates to a method and a system for laser welding of overlapped metal sheets.

BACKGROUND OF THE INVENTION

The welding of overlapped metal sheets by means of a laser beam has been proposed since a long time, particularly in the automotive industry, for the production of motor vehicle bodies or parts thereof, in view of the more conventional electric spot welding technique. After a first increasing spread of the laser welding technique approximately starting from 1990 (see for example European Patent EP-B-0 440 001 in the name of Comau), the application of this technology in the automotive industry has seen a stop due to the increasing use of car bodies made of zinc-plated sheets, i.e. sheets coated with a zinc protective layer, for instance deposited by galvanization. Zinc has a melting temperature of 419° C. and evaporization temperature of 906° C., whereas this steel constituting sheet typically has a melting temperature around 1,530° C. To weld the sheets it is necessary to bring the steel of which they are formed to melt, which means that welding is carried out in the presence of zinc vapours. In the case of electric spot welding, these vapours do not give rise to any substantial draw-backs, since the steel of the sheets starts to melt at the contact area between the sheets (because this area is that having the highest electric resistivity) and since the welding electrodes also apply a pressure on the sheets, which causes evacuation from the sheet contact area of any quantities in excess of melting bath and zinc vapours. In the case of laser welding, instead, the melting bath starts to be formed at the outer surface of the sheet against which the laser beam is directed. As soon as the area of the melting bath, which typically assumes a keyhole-like shape, extends down to the contact area between the sheets, the zinc vapours, which have been created meanwhile at this area, escape outwardly passing through the route of lower resistance, which is represented by the melting bath itself. Therefore, sprays of melted metal are created, which jeopardize the quality and stability of the welded joint, as well as the aesthetical appearance of the product obtained.

Various solutions have been already proposed in the endeavour to overcome the above-mentioned draw-back. A first solution lies in modifying the shape of at least one of the sheets in the welding area, so as to define a gap between the overlapped sheets, which can be exploited by the zinc vapours to escape outwardly (see for example U.S. Pat. Nos. 4,682,002 and 4,916,284). A similar solution lies in providing spacing elements between the sheets, again in order to define a gap for evacuation of the zinc vapours (WO-A-99/08829, JP-A-531855). However all the above-mentioned known solutions have the draw-back to require an additional operation with respect to the conventional work cycle, since it is necessary to form the above-mentioned spacing portions in the sheets or anyhow to apply additional spacing elements, which increases time and cost of production.

The object of the present invention is to overcome the above-mentioned technical problem in a simple and efficient manner.

SUMMARY OF THE INVENTION

In order to achieve this object, the invention provides a method for laser welding of two overlapped metal sheets, wherein at least one of the sheets has a protective layer on its surface in contact with the other sheet, said protective layer being made of a material having a vaporization temperature lower than the melting temperature of the metal forming the sheet, wherein the sheets to be welded are clamped with each other during the welding operation with the aid of clamping means, and wherein welding is carried out by directing a laser beam to the area to be welded of the clamped overlapped sheets, characterized in that welding is carried out by holding the sheets slightly spaced apart from each other at the welding area by means of said clamping means, so that the vapours of protective material, which are created during welding can escape through the gap defined by the two sheets.

In other words, the basic idea of the invention goes against a technical prejudice, which can be found in the known art. In all the known welding systems of the above-mentioned type, indeed, clamping means are provided, which are for clamping the sheets in position during the welding operation. The prejudice mentioned above lies just in that the clamping means were always conceived to press the sheets in contact against each other in order to enable welding to be carried out. In the case of the invention, instead, the clamping means for clamping the sheets in their operative condition do not press the sheets against each other, but rather hold the sheets in a slightly spaced position relative to each other. Studies and tests conducted by the applicant have shown that this slight spacing does not jeopardize the possibility to obtain a welded joint of good quality, since in the welding area the gap between the two sheets is filled by the bath of metal melted by the laser beam. At the same time, the gap between the sheets immediately adjacent to the welded areas enables the zinc vapours, which are created during the welding operation, to escape outwardly with no need to pass through the melted bath and therefore without giving rise to any of the above-mentioned welding defects.

According to the invention, at least one of the sheets is welded in said condition spaced apart from the other sheet with the aid of holding means forming part of said clamping means. The holding means are for instance selected among vacuum cups or magnetic-type holding means.

In the preferred embodiment of the invention, the said clamping means include a support defining a reference and supporting surface for a first sheet, and a clamping member, which is movable with respect to the support between an inoperative position and an operative pre-determined position, in which said movable member defines a reference and supporting surface for the second sheet, the supporting surface on the movable member facing in this operative condition, the supporting surface on the support and being spaced apart therefrom of a length greater than the sum of the thickness dimensions of the sheets to be welded.

Also according to the invention, both the sheets are initially positioned, overlapped with each other, on the reference and support surface of the support, with the clamping movable member in its inoperative position, whereupon the clamping movable member is moved to its operative position so as to bring the support surface of the movable member in front of that of the support, with the second sheet still resting on the first sheet and spaced from the support surface of the movable member. The second sheet is finally grasped and brought against said support surface of the movable member with the aid of said holding means, so as to move the second sheet away from the first sheet. The holding means are able to hold the two sheets in this spaced-apart position while the welding operation is carried out, so as to obtain the advantages which have been mentioned above.

Naturally the invention is also directed to the welding system using the method according to the invention, said system comprising clamping means for clamping the sheets to be welded in position during the welding operation, and means for directing a laser beam to the welding area of the clamped overlapped sheets. As already indicated above, the clamping means are arranged for holding the sheets slightly spaced apart from each other at the welding area during the welding operation. To this end, as indicated above, the clamping means include holding means selected among vacuum cups, magnetic-type means or the like, to hold at least one of the sheets in its condition spaced from the adjacent sheets. Also according to what has already been indicated, in the preferred embodiment, the clamping means comprise a support and a clamping member, which is movable relative thereto. In this embodiment, the above-mentioned holding means are for instance associated with the movable member of the clamping means and are movable, when the clamping movable member is in its operative position, between a forward grasping position and a rearward holding position.

Finally, the invention is also directed to a clamping device taken alone, which can be used to clamp in position two overlapped metal sheets to be welded and having the features which have been already indicated above. The holding means associated with the clamping movable member are movable, when the clamping movable member is in its operative position, between a forward grasping position and a rearward holding position, in which they are able to hold the second sheet spaced apart from the first sheet. As already indicated the holding means may be in form of one or more vacuum cups, or may be magnetic-type holding means or the like. In the former case, actuating means may be provided to drive the movement of the suction cup means between the forward position and the rearward position. Alternatively, the suction cup means are provided so as to include a suction cup portion carried at the end of a bellow-like tubular stem serving for communication of the suction cup to a vacuum source, so that when vacuum is communicated to the suction cup to enable the second sheet to be grasped, the bellow-like stem is contracted, causing the movement of the suction cup towards its rearward position, in which the sheet, after it has been grasped, is kept in a condition spaced apart from the other sheet.

Naturally, the possibility is not excluded to provide clamping devices of a completely different type, such as devices provided with grasping means able to engage both the first sheet and the second sheet. It is also possible to provide a clamping device, in which, instead of a support and a movable member, two members are provided, which are both movable, each provided with respective holding means.

Furthermore, also the grasping means can be made in any way different from that has been described above, while the principle remains which is at the basis of the invention, which is that of holding the two sheets clamped in a position slightly spaced apart from each other during the welding operation.

BRIEF DESCRIPTION OF THE DRAWINGS

Further features and advantages of the invention will become clearly apparent from the description which follows with reference to the annexed drawings, given purely by way of non-limiting example, in which:

FIG. 2 is a diagrammatic side view of an embodiment of a clamping device according to the invention, in its inoperative position, FIG. 3 is a cross-sectional view taken along line III—III of FIG. 2, FIG. 4 shows the clamping device of FIG. 2 in its operative condition, with the suction cup members in their forward grasping position, FIG. 5 is a cross-sectional view taken along line V—V of FIG. 4, at an enlarged scale.

In FIG. 1, reference numerals 1, 2 respectively designate two sheet elements of zinc-plated steel forming part of a motor vehicle body. The elements 1, 2 have planar parallel and overlapped flanges 1a, 2a, which are welded to each other at welding sections W, by means of a laser beam L (which is focused by a device which is not illustrated), which moves relative to sheets 1, 2. According to the invention, during welding, flanges 1a, 2a are clamped in position by means of one or more clamping devices 3, which hold the flanges 1a, 2a in a slightly spaced apart position relative to each other. To this end, each clamping device 3 comprises a support 4, which defines a reference and supporting surface for flange 2a, and a movable member 5, which is rotatably mounted with respect to support 4 around an axis 6 between an inoperative position (not shown in FIG. 1) and an operative position (shown in FIG. 1) in which the movable member 5 defines a reference and supporting surface 5a for flange 1a. In the illustrated operative position of the movable member 5, the reference and supporting surfaces 4a, 5a, which are respectively defined by support 4 and movable member 5, are spaced away from each other of a length greater than the sum of the thickness dimensions of flanges 1a, 2a of sheets 1, 2. Each movable member 5 is provided, in the case of the illustrated example, with two holding members 7, which will be illustrated more in detail in the following, which can be for example of the suction cup type or of magnetic-type. The holding members 7 are movable with respect to the movable member 5, when the latter is in its illustrated operative position, between a forward position, in which they grasp the flange 1a after that this flange has been preliminary overlapped in contact with flange 2a, and a rearward position (displayed upwardly with reference to FIG. 1), in which the holding members keep flange 1a in contact with the reference and supporting surface 5a of each movable member 5. In this condition, the two flanges 1a, 2a are slightly spaced apart from each other, so as to define a gap G through which the zinc vapours, which are formed during welding, can escape.

FIGS. 2, 3 show the clamping device 5 more in detail, with reference to the embodiment making use of suction cup holding members. These figures relate to the inoperative position of the clamping device. As shown, the support 4 is a support defining a reference and supporting surface 4a for flanges 1a, 2a, the position of which in space is determined. The movable member 5 is pivotally connected around axis 6 to a fork-shaped end support 4. The annexed drawings do not show the actuating means, which are used for controlling rotation of the movable member 5 with respect to support 4. These means can be made in any known way and can be for example in form of a fluid cylinder, or of an electric actuator. These details of construction are not included in the present description, since they can be provided, as already indicated, in any known way and moreover since these details, taken alone, do not fall within the scope of the invention. Finally, the deletion of these details of construction from the drawings renders the latter simpler and easier to understand.

Figure 1:
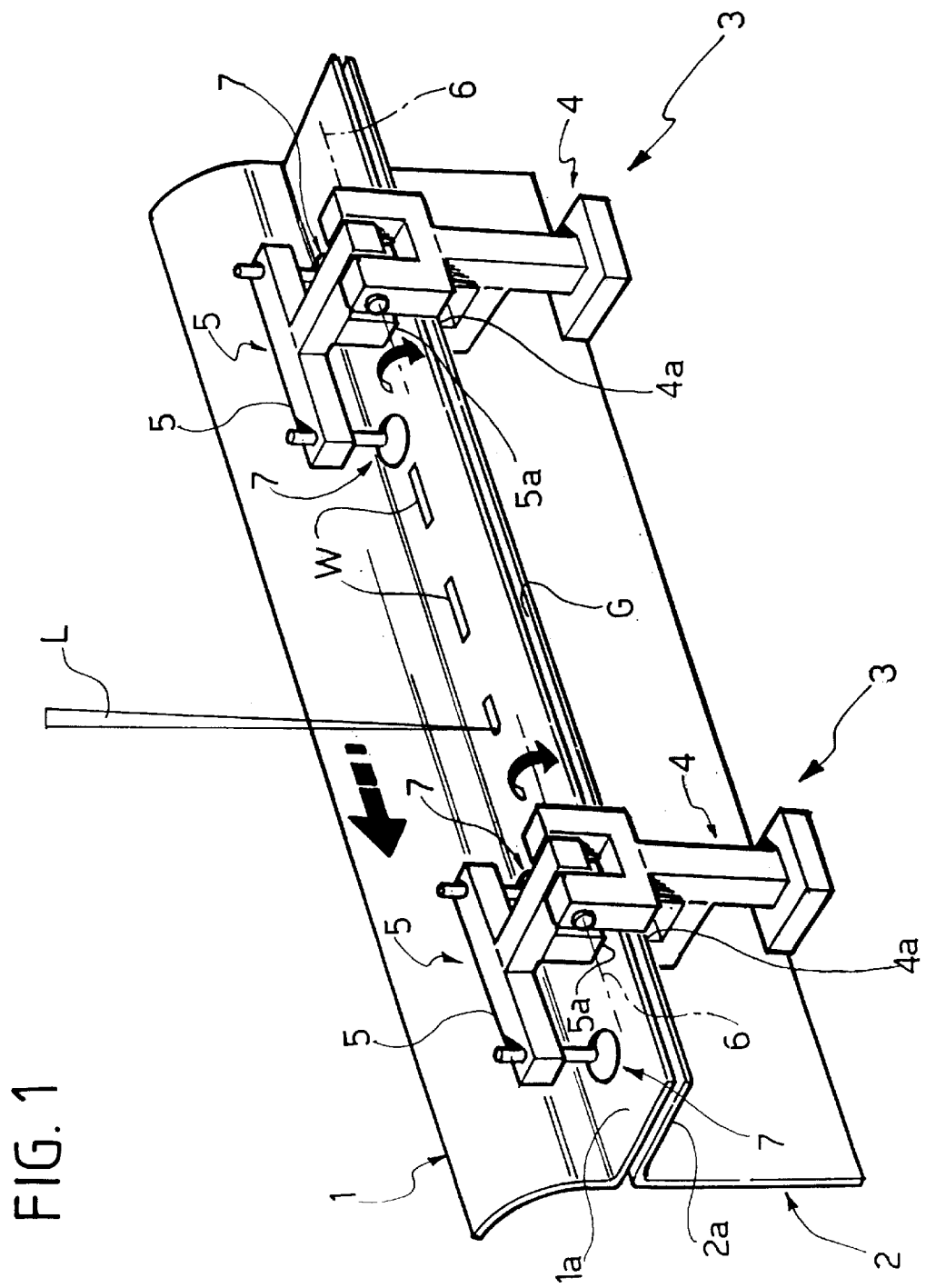
FIG. 1 is a perspective view, which diagrammatically shows the welding method according to the invention.

Reverting to FIGS. 2, 3, each movable member 5, in the illustrated example, is provided with two holding members 7 each constituted by a suction cup 7a, which is to be put in communication with a vacuum source (not shown) through a tubular stem 7b. Stem 7b is movable along its axis with respect to the movable member 5 so that, when the movable member 5 is in its operative position shown in FIG. 1, the suction cup 7a is movable between a forward grasping position for grasping flange 1a and a rearward position (displayed upwardly with reference to FIG. 1) for holding flange 1a in a position spaced apart from flange 2a.

FIG. 4 shows the structure of FIG. 2 in the operative condition of the movable member 5, with the holding members 7 in their forward condition.

FIG. 5 is a cross-sectional view taken along line Figure V—V of FIG. 4. The clamping device is arranged so that the operative position of the movable member 5 is precisely pre-determined and is defined by stop means of any known type (not shown) defined between support 4 and movable member 5. In other words, differently from what happens in known systems, the movable member 5 is not rotated to a position in which it presses the two flanges 1a, 2a against each other. As clearly shown in FIG. 5, when the movable member 5 is in its operative position, the reference and supporting surface 5a of the movable member 5 is parallel and facing the reference and supporting surface 4a of support 4. However, the distance D between these surfaces is greater than the sum of the thickness dimensions $S_1$, $S_2$ of the two flanges 1a, 2a.

Figure 6:
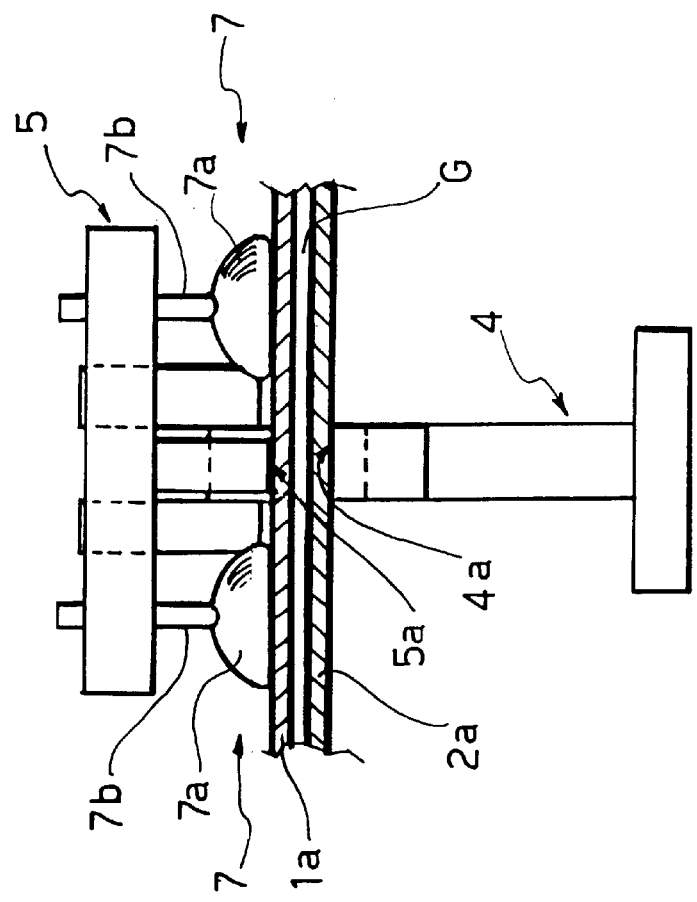
FIG. 6 shows the clamping device of FIG. 1 in its operative condition, with the suction cup holding members in their rearward position, in which the two sheets to be welded are held spaced away from each other.

As shown in FIG. 2, when the clamping device 3 is in its inoperative condition, the two flanges 1a, 2a are overlapped in contact with each other over the reference surface 4a of support 4. With reference to FIG. 5, when the movable member 5 is brought to its operative condition, the section cups 7a are brought to their forward grasping condition, in which they enter in contact with the upper surface of flange 1a. In this condition, the suction cups 7a can be pressed against the flange 1a and the vacuum can be communicated thereto through the tubular stems 7b. These stems are then driven so as to move rearwardly (i.e. upwardly with reference to FIG. 5) so that the flange 1a grasped by the suction cups is brought in contact with the reference and supporting surface 5a of the movable member 5. This condition is visible in FIGS. 6, 7.

Figure 9:
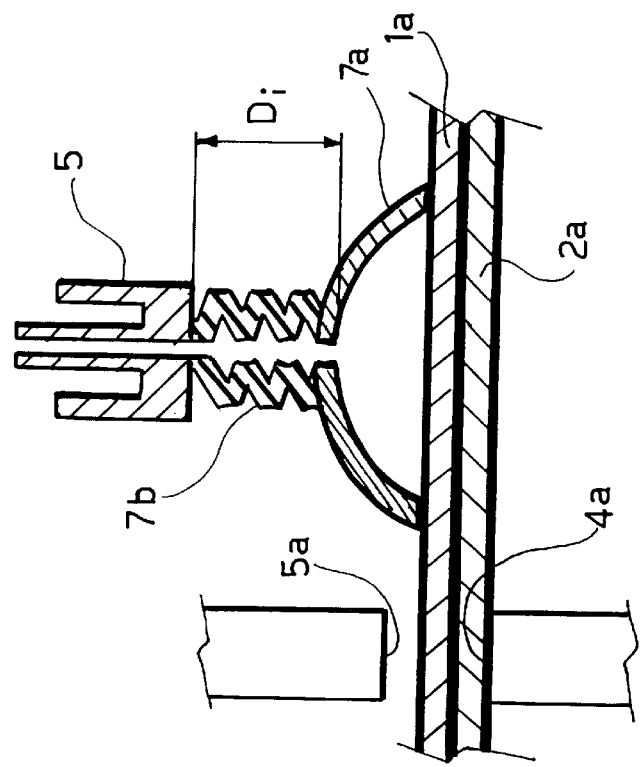
FIG. 9 shows a variant of FIG. 8, in the inoperative condition.
Figure 8:
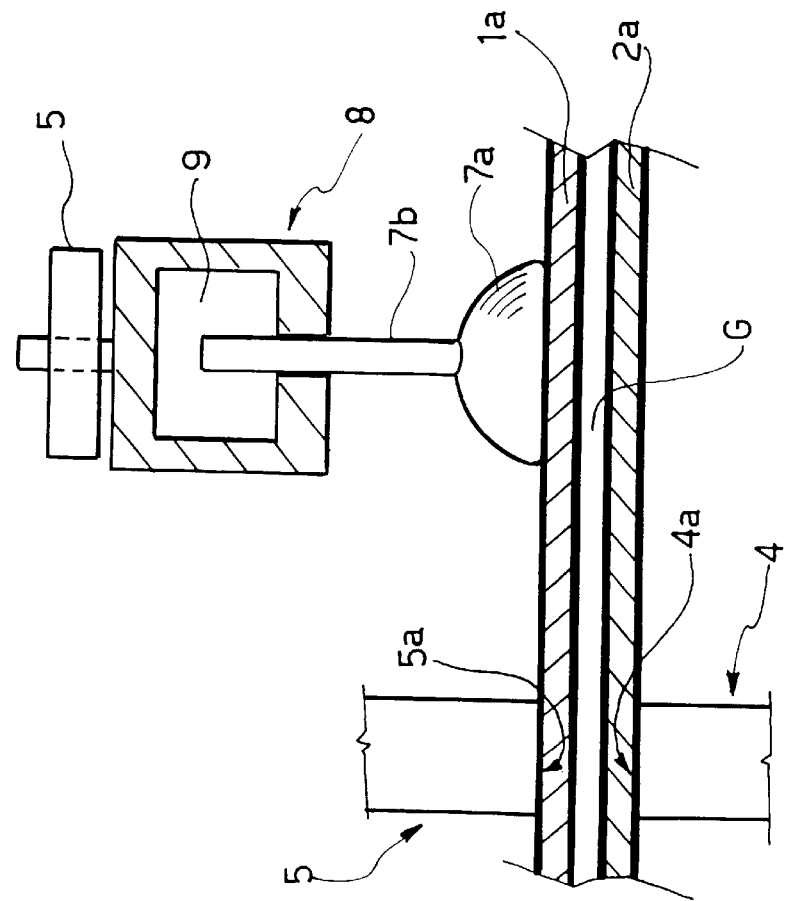
FIG. 8 is a view at an enlarged scale of a detail of FIG. 7, which refers to a first embodiment of the suction cup holding means.
Figure 10:
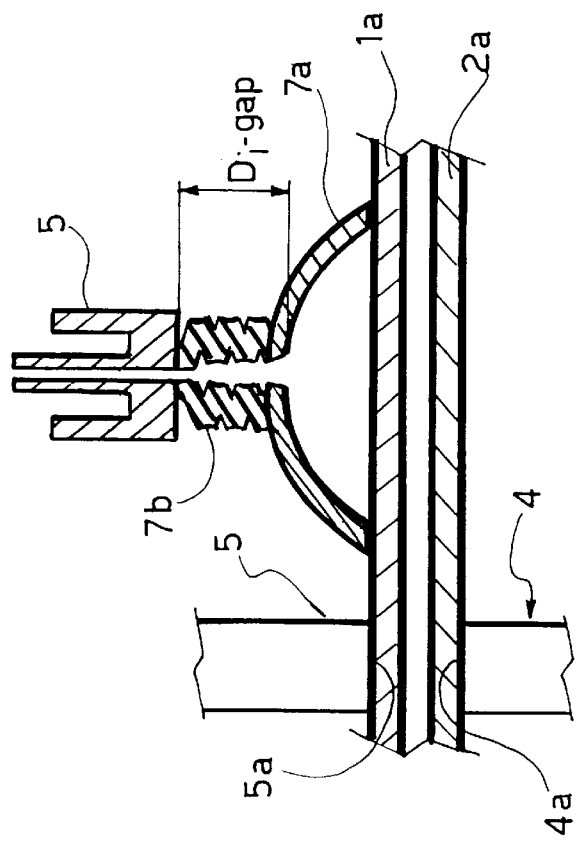
FIG. 10 shows the solution of FIG. 9 in its operative condition.

The annexed drawings do not show in detail the means used for driving the movement of the suction cup devices 7 between their forward grasping position and their rearward position. By way of example, and diagrammatically, FIG. 8 shows a case in which the tubular stem 7b is connected to a hollow body 8, whose cavity 9 communicates with a vacuum source. This stem 7a is rigidly connected to the hollow body 8 and the latter is instead movable with respect to the movable member 5 by means of any control devices (not shown) FIGS. 9, 10 show a variant in which the tubular stem 7b is in form of a bellow so that when the cavity of the suction cup is put in communication with the vacuum source, the bellow-like stem 7b is contracted causing a rearward displacement of the suction cup 7a.

Figure 7:
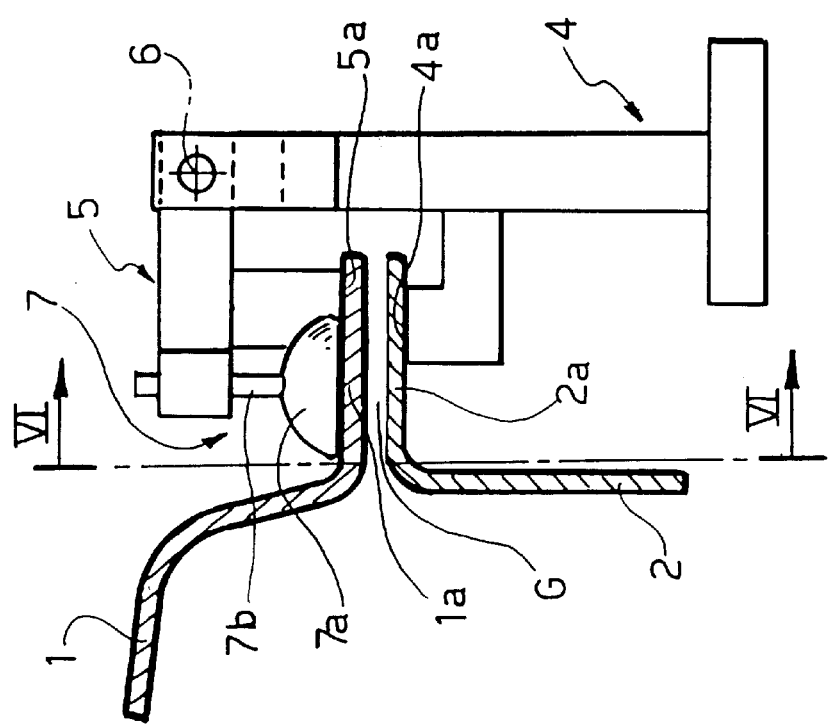
FIG. 7 is a cross-sectional view taken along line VII—VII of FIG. 6.
Figure 11:
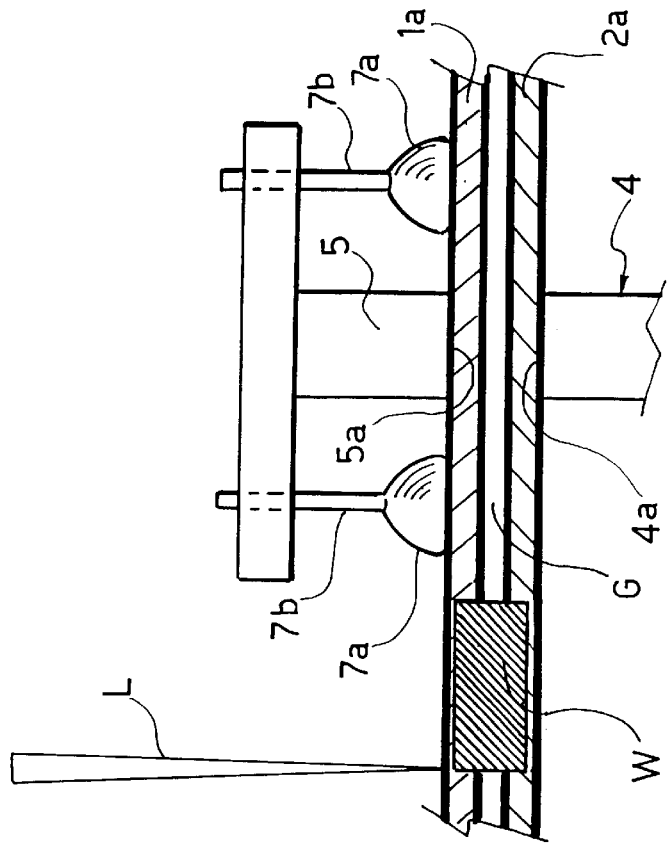
FIG. 11 is a further view corresponding to that of FIG. 7, which shows the welding method according to the invention.

FIG. 11 is a view corresponding to that of FIG. 7, which shows how welding is carried out while sheets 1a, 2a are kept spaced apart from each other in the way which has been described above. As shown in the sections where the laser beam L is directed, the gap G is filled by the melted bath of the welding area W, which then solidifies upon cooling. In the remaining sections, instead, between the sheets there remains the gap G, which enables the zinc vapours, which are created during welding, to escape without giving rise to any welding defects.

Naturally, as already indicated many times in the foregoing, in lieu of the suction cup holding means, it would be possible to use magnetic-type means, or any other type of holding means. It would also be possible to provide holding means for both the members of the clamping device, in order to hold all the sheets. Furthermore, the clamping device could have both its elements movable between an opened and a closed condition. The entire structure of the clamping device could be then provided with the possibility of a limited adjusting movement, for self centering on the area of the structure to be welded.

Finally, while the principle of the invention remains the same, the details of construction and the embodiments may widely vary with respect to what has been described and illustrated purely by way of example, without departing from the scope of the present invention.

What is claimed is:

1. Method for laser welding of two metal sheets, which are overlapped with eat other,
   wherein at least one of the sheets has a protective layer on its surface in contact with the other sheet, said protective layer being made of a material having a vaporization temperature lower than the melting temperature of the material forming the sheet,
   wherein the sheets to be welded are clamped with each other during the welding operation with the aid of clamping means, and
   wherein welding is carried out by directing a laser beam to the welding area of the clamped overlapped sheets,
   wherein welding is carried out by adjustably holding the sheets slightly spaced apart from each other at a pre-determined distance at the welding area by means of said clamping means, so that the vapours of protective material, which are created during welding, can escape through the gap defined by the sheets.

2. Welding method according to claim 1, wherein one of the sheets is held in said condition spaced apart from the adjacent sheet with the aid of holding means.

3. Welding method according to claim 2, wherein the holding means are selected among vacuum cups or magnetic-type holding means.

4. Welding method according to claim 2, wherein said clamping means include a support defining a reference and supporting surface for a first sheet and a clamping member movable with respect to the support between an inoperative position and a pre-determined operative position, in which said movable member defines a reference and supporting surface for the second sheet, the supporting surface on the movable member facing, in this operative condition, the supporting surface on the support and being spaced apart therefrom of a length greater than the sum of the thickness dimensions of the sheet to be welded.

5. Welding method according to claim 4, wherein both sheets are initially positioned, overlapped with each other, over the reference and supporting surface of the support, with the clamping movable member in its inoperative position, whereupon the clamping movable member is moved to its operative position, so as to bring the supporting surface of the movable member to face that of the support, with the second sheet still resting over the first sheet and spaced apart from the supporting surface of the movable member, said second sheet being finally grasped and held against said supporting surface of the movable member with the aid of said holding means so as to space it from the first sheet.

6. System for laser welding of two metal sheets, which are overlapped with each other,
wherein at least one of the sheets has a protective layer on its surface in contact with the other sheet, said protective layer being made of a material having a vaporization temperature lower than the melting temperature of the material forming the sheet,
said device comprising clamping means for clamping the sheets to be welded in position during the welding operation, and
means for directing a laser beam to the welding area of the clamped overlapped sheets,
wherein said clamping means are provided to adjustably hold the sheets slightly spaced apart from each other at a pre-determined distance in the welding area during the welding operation, so that the vapours of protective material, which are created during welding, can escape through the gap defined between the two sheets.

7. Welding method according to claim 6, wherein said clamping means include holding means selected among vacuum cups and magnetic-type holding means, to keep at least one of the sheets in said spaced condition from the adjacent sheet.

8. Welding system according to claim 7, wherein there are provided holding means for each sheet.

9. Welding system according to claim 7, wherein said clamping means comprise a support defining a reference and supporting surface for a first sheet and a clamping member movable with respect to the support between an inoperative position and an operative pre-determined position, in which said movable member defines a reference and supporting surface for the second sheet, the supporting surface of the movable member facing in this operative condition the supporting surface of the support and being spaced therefrom of a length greater than the sum of the thickness dimensions of the sheets to be welded.

10. Welding system according to claim 9, wherein said holding means are associated with the movable member of the clamping means and are movable, when the clamping movable member is in its operative position, between a forward grasping position and a rearward holding position.

11. Device for clamping in position two overlapped metal sheets to be welded, wherein it comprises:
a support defining a reference and supporting surface for a first sheet,
a clamping member movable with respect to the support between an inoperative position and an operative pre-determined position, in which said movable member defines a reference and supporting surface for the second sheet, the supporting surface of the movable member facing in this operative condition the supporting surface of the support and being spaced therefrom of a length greater than the sum of the thickness dimensions ($S_1$, $S_2$) of the sheets to welded, and
holding means associated with the clamping movable member and movable, when the clamping movable member is in its operative position, between a forward grasping position and a rearward holding position, in which they are able to hold the second sheet spaced from the first sheet at a pre-determined distance and in contact with said reference and supporting surface of the clamping movable member.

12. Clamping device according to claim 11, wherein said holding means comprise section cup means movable with respect to the clamping movable member between said forward position and said rearward position.

13. Clamping device according to claim 11, wherein it comprises actuating means for controlling movement of the section cup means between the forward and rearward positions.

14. Clamping device according to claim 11, wherein said section cup means include a suction cup portion carried at the end of a bellow-type tubular stem serving for communicating with a vacuum source, so that when the suction cup portion is connected to the vacuum source to grasp the second sheet the bellow-like stem is contracted, causing movement of the section cup towards its rearward position.

15. Clamping device according to claim 11, wherein also support is provided with holding means.

16. Clamping device according to claim 11, wherein the holding means are of magnetic type.

17. Clamping device according to claim 11, wherein also said support is movable between an inoperative position and an operative position.

18. Clamping device according to claim 11, wherein the whole structure of the device is provided with the possibility of a limited adjusting movement for self-centering on the structure to be welded.

* * * * *